United States Patent [19]

Wilman et al.

[11] Patent Number: 4,567,528

[45] Date of Patent: Jan. 28, 1986

[54] DOCUMENT SCANNERS

[76] Inventors: Hugh Wilman, 76 Mount Grace Rd., Potters Bar, Hertfordshire; James Brotton, 1 Moss Dr., Haslingfield, Cambridgeshire, both of England

[21] Appl. No.: 549,197

[22] Filed: Nov. 4, 1983

[30] Foreign Application Priority Data

Nov. 5, 1982 [GB] United Kingdom ............... 8231679

[51] Int. Cl.⁴ .................... H04N 1/04; H04N 1/02
[52] U.S. Cl. ................... 358/285; 358/294; 355/25; 355/75
[58] Field of Search ............ 358/285, 293, 294; 355/25, 82, 75

[56] References Cited

U.S. PATENT DOCUMENTS

| | | | |
|---|---|---|---|
| 2,511,102 | 6/1950 | Clouser | 355/82 |
| 3,092,004 | 6/1963 | Lewis | 355/82 |
| 3,224,352 | 12/1965 | Valette et al. | 355/82 |
| 3,953,124 | 4/1976 | Kolibas | 355/75 |
| 3,989,376 | 11/1976 | Ravera et al. | 355/75 |
| 4,145,138 | 3/1979 | Mercure | 355/25 |
| 4,422,100 | 12/1983 | Du Vall et al. | 358/294 |

Primary Examiner—Howard W. Britton
Assistant Examiner—John K. Peng
Attorney, Agent, or Firm—Gifford, VanOphem, Sheridan & Sprinkle

[57] ABSTRACT

A document scanner for scanning a page of a book which includes:

1. a movable housing having at least one flat face containing a window through which light from a document to be copied can pass.
2. a scanner within the housing adapted to scan an image of the document to generate an electrical video signal corresponding to the information carried by the document,
3. means for supporting a book face upwards so that the book can be moved into contact with the window,
4. a pivoting joint between the housing and a support therefor to permit rotation of the housing into at least one other position in which the window is unobstructed and light from a remote document can be directed therethrough to form the image to be scanned.

12 Claims, 4 Drawing Figures

DOCUMENT SCANNERS

FIELD OF THE INVENTION

This invention concerns document scanners by which information carried by two inclined surfaces can be converted into an electrical video signal which can be digitalized for storaged or may be used to control a television display or the like, to produce an image of the scanned surface in the display or may be employed as an input signal to a printer/plotter. The invention is particularly applicable to the scanning of the pages of books.

BACKGROUND TO THE INVENTION

Conversion of information contained in a surface into an electrical signal can be achieved in a number of ways.

In one arrangement relative movement is effected between a spot of light and an information bearing surface and reflected light from the spot is focussed onto a photocell. As the spot moves over the surface so the reflected light level varies in relation to the information content and a varying electrical signal derived from the photocell comprises the electrical video signal.

In another arrangement an electron beam is scanned over a photoconductive surface onto which an image of the surface is focussed. The electron beam current varies with the light level at different points of the photoconductive surface and an electrical signal derived from these current variations comprises the electrical video signal.

In a further arrangement a narrow band of an illuminated information bearing surface is focussed onto a line of photoelectric elements, which are addressed in sequence and produce an electrical signal a parameter of which (such as amplitude) varies with the light level falling on the individual elements as the latter are scanned. By moving the lens and photoelectric elements relative to the illuminated surface, so the latter is scanned in a series of parallel bands, each of which is effectively "scanned" by the sequential addressing of the elements.

Other arrangements are possible, it being understood that the foregoing are only exemplary of the large number of different types of devices which can be used as a scanner.

Irrespective of the scanning employed it is usually a prerequisite that the information bearing surface to be scanned is flat and conventionally a flat support is provided on which a document can be laid out flat and where necessary, a transparent sheet such as a sheet of glass is laid over the document so as to maintain the latter flat. Alternatively the document may be laid face down on a window typically formed from a sheet of glass and if required a backing marker is laid over the document so as to maintain the latter flat in contact with the window.

Where the document to be copied is a book, the latter may be laid out flat with the page to be copied flattened for example against a window through which the page is to be viewed. However, it is found that the flattening of a book in this way can cause the binding of the book to be damaged. Where old and valuable books are to be scanned the result of opening the book out and flattening the page to be scanned can seriously damage the book and it is an object of the invention described in a copending application to provide a document scanner for scanning the pages of a book without damaging the binding of the book.

In that copending application a scanner is described which includes a camera within a wedge shaped housing which views the page to be scanned through a window in the housing.

It is an object of the present invention to provide a document scanner which will allow both pages of the book to be scanned without the need to lower the book and turn it around.

SUMMARY OF THE INVENTION

According to the present invention a document scanner for scanning the opened pages of a book comprises:
(1) a housing having a downfacing wedge section with windows in two adjoining faces thereof which can be positioned with the ridge of the wedge in the gutter of a partially opened book,
(2) lamp means within the housing for illuminating pages positioned against the two windows,
(3) a scanning camera hereinafter referred to as a scanner adapted to scan in turn each of the two pages which are visible through the windows, to generate electrical video signals corresponding to the information carried by each of the pages in turn,
(4) a V-shaped trough in which the book will rest, the angle of the trough corresponding to the included angle of the wedge shaped housing and aligned therewith so that a partially opened book resting in the trough can be sandwiched between the windowed faces of the wedge and the sides of the trough, and
(5) means for effecting relative movement between the housing and the trough to permit movement apart (to enable a book to be positioned in or removed from the trough and pages to be turned) and movement together (to sandwich the book therebetween for scanning).

The invention thus provides an efficient device for scanning both of the upturned pages of an opened book without the need to raise or lower the book or turn the book around.

In one embodiment of the invention two scanners and if required two lamps are provded in the housing and electrical switching is used to select the appropriate scanner and lamp so that each page can be scanned in turn or if required both opened pages can be scanned simultaneously.

On the other hand each page may be conveniently illuminated and scanned through the same window after which the scanner or the image forming optics or both and if required also the illuminating lamp means may be moved within the housing to scan and illuminate the other page. The trough is conveniently formed from two upwardly divergent plate means.

Conveniently a channel is provided between the two lowermost edges of the two plate means so as to accommodate the spine of a book resting in the trough formed by the two plate means.

In a preferred arrangement the two plate means are relatively movable so as to alter either the included angle therebetween or the lateral spacing between the two lowermost edges of the two plate means, or both, so as to allow the configuration of the trough to be varied to accommodate different thicknesses and differently bound books.

In addition or alternatively one or both of the plate means may be vertically mounted so as to allow the trough to follow precisely the configuration of any book laid therein, after the book has been entered by the wedge shaped housing.

The surface of each plate may be at least in part be formed from resiliently deformable material such as a foamed plastics material or the like, to accommodate any unevenness in the external surfaces of a book's covers such as may often occur with old, leather bound books and the like.

Preferably drive means is provided to cause the trough to be lifted up and lowered down relative to the scanner housing.

Preferably the drive means is in two parts, one part being a powered drive for raising the trough up to a position at which it is a little below the wedge shaped housing and for lowering the trough in a downward direction from this position, and the other part being a manual drive by which the trough can, under the direct control of an operator, be moved upwardly (so as to squeeze the book below the wedge shaped housing), and moved downwardly from this position, to allow the book to be removed and/or the pages turned.

Preferably circuit means is provided for detecting when the book support has been moved into contact with a sensing device and means are provided to inhibit the powered drive means as soon as the book support comes into contact therewith.

The sensing device may be a micro switch or proximity switch and its vertical position may be adjustable relative to the underside of the wedge shaped scanner housing.

In a preferred arrangement the sensing means detects a preselected position of the document relative to the wedge shaped housing to inhibit or alter the operation of the powered drive means before the document makes contact with the housing.

In a preferred embodiment the scanner has a long narrow sensor and is mounted so that the length dimension of sensor is parallel to one edge of the window and scanning is achieved by moving the scanner within the housing so that the sensor is moved across the window, always parallel to the said one edge thereof whilst all the time a sequential sampling of the light level at points along the length of the field of view is performed, so as to produce an electrical video signal.

Preferably, where the scanner is moved relative to the window, it is constrained so as always to be the same distance from the window, so as to maintain focus.

Preferably means are provided for altering the focus of the focussing device (typically a lens) within the scanner and/or the depth of focus of the focussing means.

Preferably an elongate light source is employed as the lamp means which is positioned parallel to the sensor of the scanner but just off axis so as not to be in the field of view of the scanner.

In a preferred embodiment the lamp means is carried on a frame which itself extends from and is rigidly attached to or forms part of a movable mounting carrying the scanner.

The scanner is conveniently electrically connected to circuit means for powering the scanner (as required) and converting an electrical signal obtained from the scanner into an electrical video signal.

Preferably lateral movement is permitted between the trough book support and its supporting platform in a direction perpendicular to the lowermost edge of the scanner housing which engages the book gutter to allow a book to centre itself as it is offered up to the scanner housing.

BRIEF DESCRIPTION OF THE DRAWING

The invention will now be described by way of example with reference to the accompanying drawings in which.

DETAILED DESCRIPTION OF A PREFERRED EMBODIMENT OF THE PRESENT INVENTION

Figure 1A:
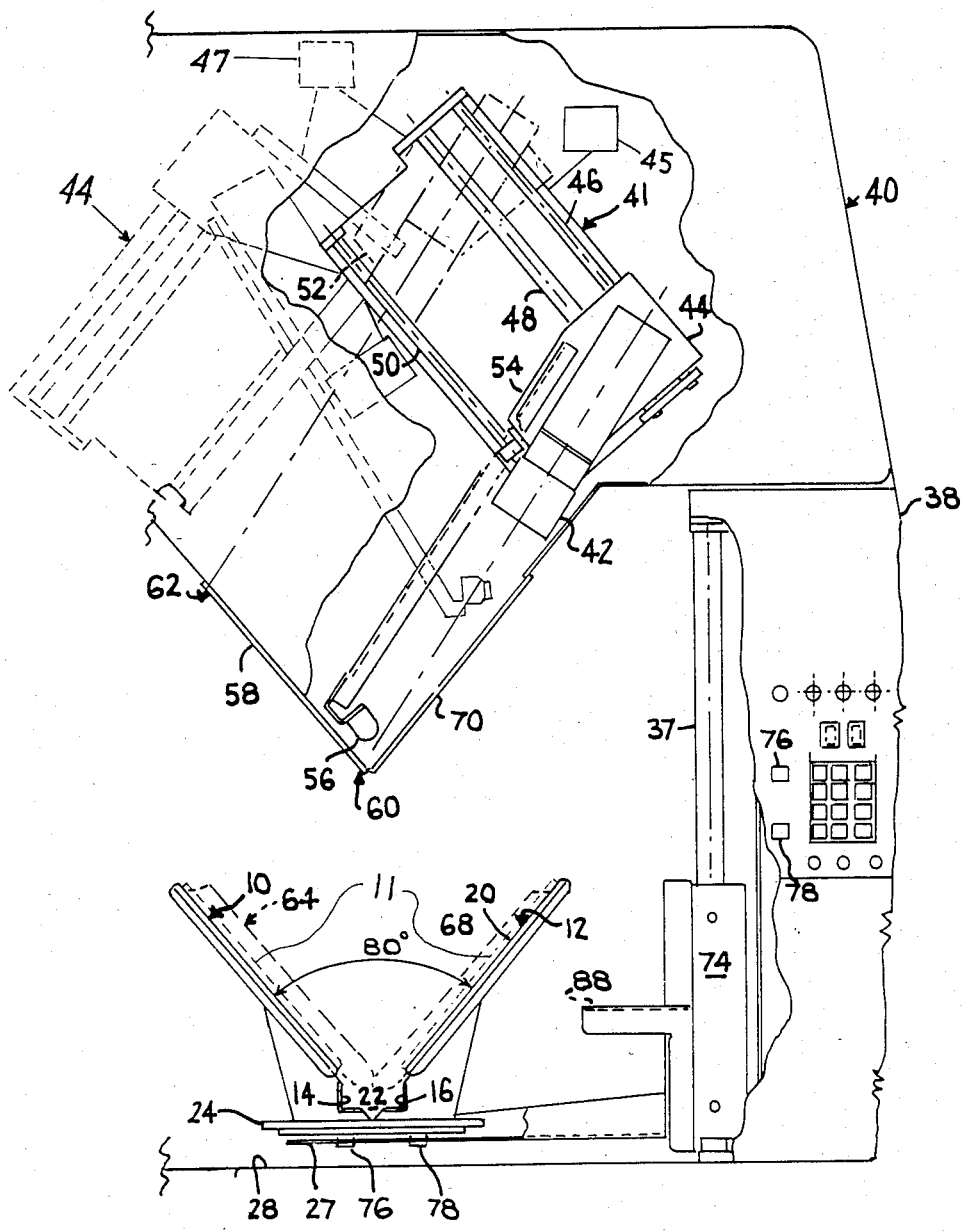
FIGS. 1a and 1b are side elevation from the front of a book support and scanner constructed in accordance with the invention.
Figure 1B:
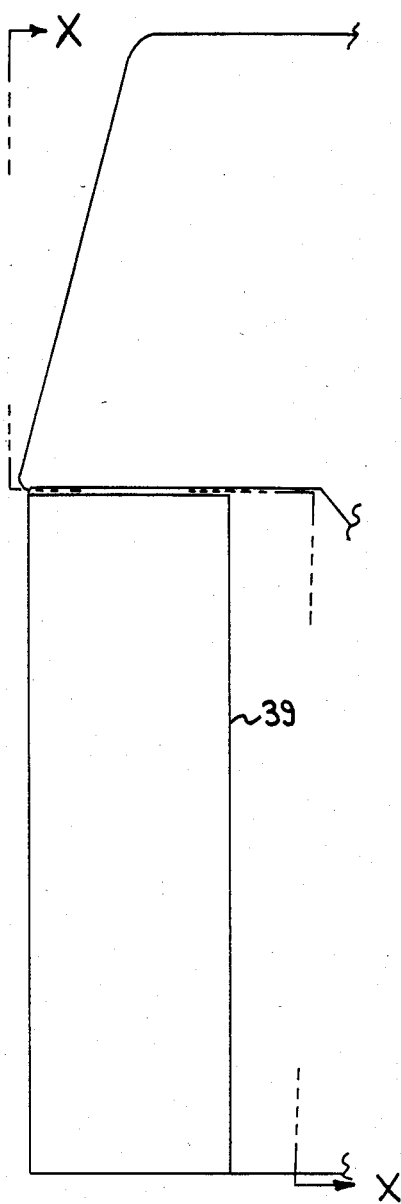

FIG. 1 illustrates in side elevation a complete scanner unit and book support. The latter comprises a pair of diverging plates generally designated 10 and 12 and each comprising a metal inner member 14 and 16 and an outer coating of plastics material 18 and 20 respectively.

The two metal struts 14 and 16 are joined in a channel arrangement at 22 which itself is attached to a support 24 of a bearing assembly having a lower ring 26 which is secured to a lifting base 27 (to be described in more detail hereinafter) mounted on a lower final base 28.

The base 28 serves as a support for a column 37 and associated housing 38 which houses controls and drives as required.

At the upper end the column provides a support for a housing 40 within which is located an asembly 41 comprising a camera 42 such as a Fairchild type CCD 1500. The latter is mounted rigidly on a platform 44 the underside of which slidably engages a guide rail 46 and includes a driving collar threadedly engaged on a screw threaded rod 48. Rotation of the collar produces lateral movement of the platform 44 parallel to the guide rail 46.

A second column housing 39 provides support at the opposite end of housing 40.

A further guide rail at 50 prevents any torsional movement of the platform.

A drive means (not shown) such as an electric motor is provided on the underside of the platform to drive the latter from one end of its traverse to the other.

The position of the platform 44 at the opposite end of its traverse is shown in dotted outline at 52.

Protruding from the platform is an arm 54 which is shown broken in order to reduce hidden detail to the minimum. The lower end of the arm 54 carries a strip light 56 and electrical connection to the strip light is achieved through a flexible cable (not shown).

As the platform 44 moves along its rails, so the light 56 travels by the same lateral distance.

The light 56 is positioned just behind a window 58 in the lower end of the housing 40 and the scanner 42 is arranged to view a narrow strip which extends perpendicular to the direction of travel of the platform 44 and which with movement of the platform 44 from one end to the other of the rails 46 and 50, causes the viewing strip to move laterally from the end 60 to the end 62 of the window 58 and in the reverse direction back again from 62 to 60.

The camera comprises a linear array of photoconductive junctions (charge coupled devices) and an appropriate lens (all not shown) so that a document positioned just to the left of the window 58 will be brought to focus in a plane containing the line of photoconductive junctions.

An electrical scanning circuit scans the junctions in succession so as to produce a series of electrical pulses corresponding to the illumination levels along the narrow field of view seen by the camera at any instant. By synchronizing the movement of the scanner 42 and the rate of movement along the rails 46 and 50 the outward signal will approximate to a video signal similar to that obtained by rectilinear line scanning.

A book is shown in dotted outline at 64, opened and resting on the two inclined diverging supports 10 and 12. The upwardly facing surface of the left hand open page 64 will be viewed by the scanner 42 through the window 58 and a video signal of the page concerned can be obtained by scanning in the manner previously described. The surface of each plate may be at least in part formed from a resiliently deformable material as shown at 11 in FIG. 1a to accommodate any unevenness in the book cover.

By rotating the assembly 41 within the housing 40 and the camera 42 relative to the platform 44 to the position shown at 41', by appropriate means as is diagramatically shown at 45, the opposite facing page 68 visible through the window 70 can be scanned and converted into a video signal in a similar manner. Where the lamp 56 is also carried by an arm 54 attached to the plate 44, the arm 54 must also be moved parallel to the camera. Alternatively, the diagramatic representation 41' illustrates the second scanner and lamp which can be installed and operated simultaneously or sequentially with the first scanner by electrical switching means 47.

In order to present the book to the housing 40 the support assembly carried by the lifting platform 27 can be elevated until the pages of the book are in contact with the windows 58, and 70. To this end an electric motor drive shown in dotted outline at 72 is provided in the housing 38 and the lifting platform 27 is attached to a sleeve 74 carried by the column 37 which is driveable up and down the column by means of the electric motor 72 typically via the gearbox and clutch mechanism.

Up and down controls at 76 and 78 respectively are provided for appropriate rotation of the electric motor 72.

The second page of the book can be scanned through window 70 after rotation of the assembly 41 within the housing and the camera 42 relative to the plate 44 etc.

In accordance with a preferred feature of the invention a stop mechanism is provided which detects when the book is just below the housing 40 with the book still out of contact with the windows 58 and 70. At this position the motor 72 is stopped automatically and a form of manual control is provided to allow the book to be offered up into contact with the housing 40 under hand control. Although not shown, a ratchet or clutch mechanism is provided which allows the assembly carried by the lifting platform 27 to be moved in an upward direction without fall-back occurring and a declutching device (again not shown) is provided to allow the platform to be moved in a downward direction after the pages 64 have been scanned.

Although not shown, stop means is provided at the bottom of the travel to arrest the movement of the motor and downward movement of the sleeve 74 before bottoming. In order to provide for a degree of shock absorbing, the ring 26 may be carried by rubber bushes at 76 and 78.

Figure 2:
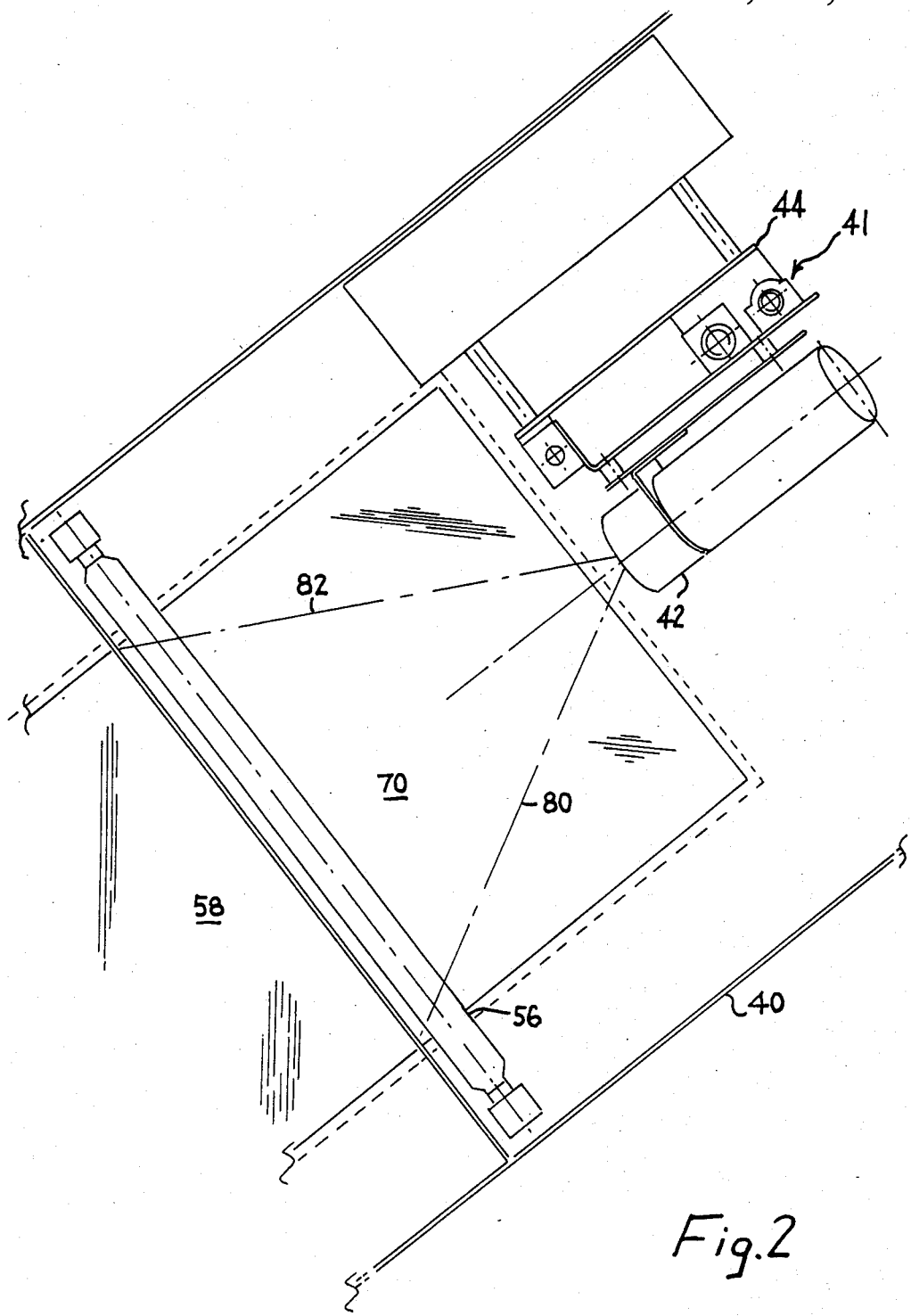
FIG. 2 is a plan view of part of the scanner housing of FIG. 1a, FIG. 3 is an end view of the unit shown in FIG. 1b cross sectioned on line XX.

FIG. 2 is a cross-section through the housing 40 viewed from above and shows one of the two windows 58 or 70 in relation to the elongate fluorescent tube 56 previously shown in FIG. 1. In addition the field of view of the camera 42 is demonstrated by the diverging lines 80 and 82. To this end the divergence is intended to accommodate the full height of the window 58 and the lateral movement of the scanner 42 is intended to cover the perpendicular dimension of the window 58.

Figure 3:
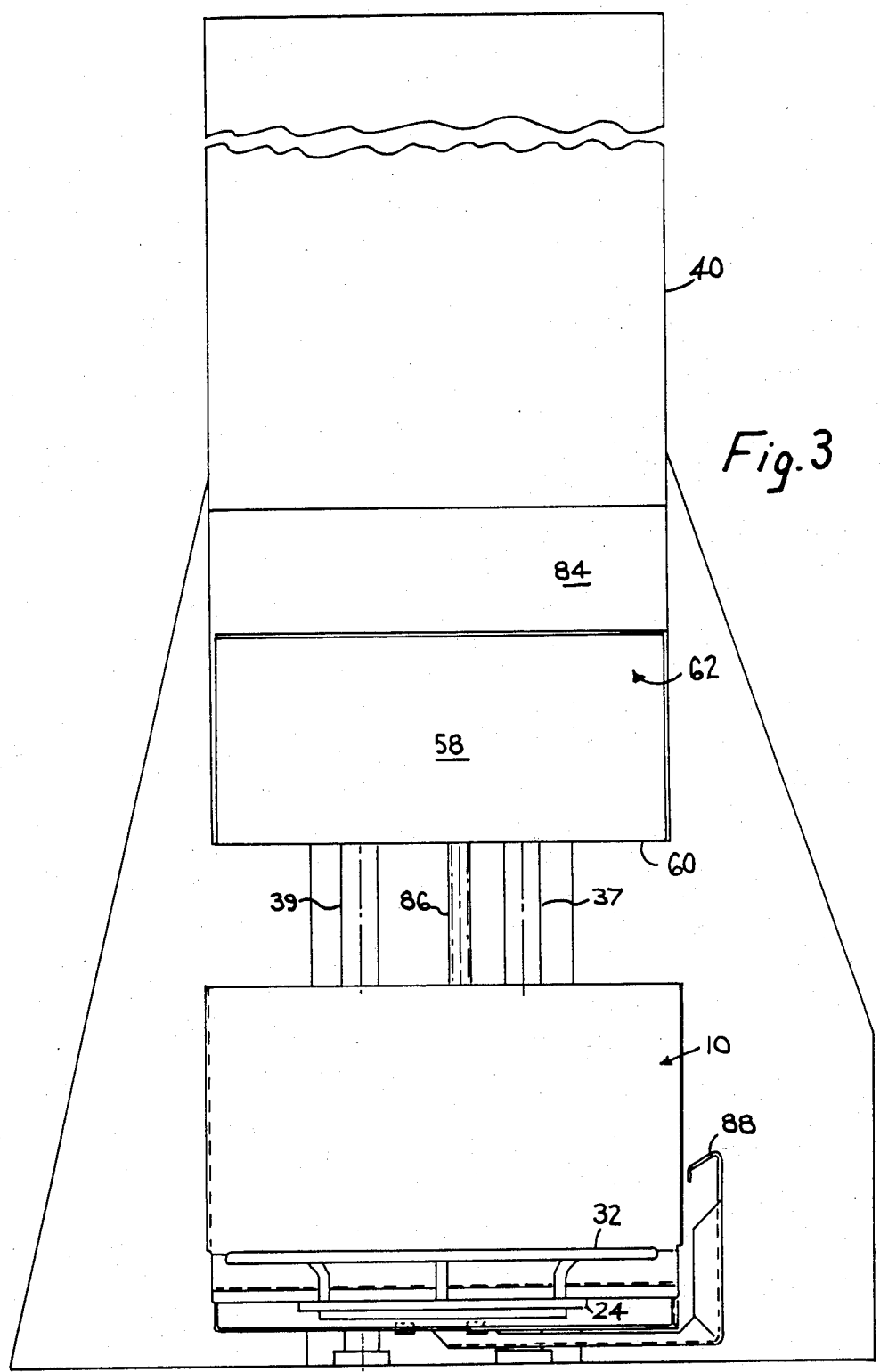

FIG. 3 which is an end elevation of the equipment shown in FIG. 1, illustrates by reference to one the extent of each of the windows 58 and 70 in the lower inclined face 84 of the housing 40.

The left hand side of the book support 10 can clearly be seen in FIG. 3.

As is more clearly seen in FIG. 3, the column 37 is one of a pair the other being denoted by reference numeral 39 and drive to the lifting platform 27 is achieved through rotating screw 86 located between and parallel to the two columns of 37 and 39.

By using two columns any tendency of the book support assembly to twist about the axis of the screw threaded drive 86 will be prevented.

FIG. 3 also shows the handle 88 (also shown in FIG. 1) which extends laterally from the sleeve 74 and can be used by the operator to raise and lower the support manually during the last part of the travel.

A further refinement not previously mentioned has been incorporated namely a sliding movement between the trough 10, 12 and the platform 27 in the direction toward and away from column 37 so as to allow a book gutter to be self centering relative to the vertex 60.

We claim:

1. A document scanner for scanning the opened pages of a book comprises:
   (i) a housing having a downfacing wedge section with windows in two adjoining faces thereof which can be positioned with the ridge of the wedge in the gutter of a partially opened book,
   (ii) at least one lamp means within the housing for illuminating pages positioned against the two windows,
   (iii) at least one scanning camera hereinafter referred to as a scanner adapted to scan in turn each of the two pages which are visible through the said windows, to generate electrical video signals corresponding to the information carried by each of the pages in turn,
   (iv) a V-shaped trough in which the book will rest, the angle of the trough corresponding to the included angle of the wedge shaped housing and aligned therewith so that a partially opened book resting in the trough can be sandwiched between the windowed faces of the wedge and the sides of the trough, and
   (v) means for effecting relative movement between the housing and the trough to permit movement apart to a first position which permits a book to be positioned in or removed from the trough and pages to be turned and movement together to a second position at which the book is sandwiched therebetween for scanning.

2. A document scanner as claimed in claim 1 comprising two scanners in the housing and electrical switching is provided to select one or both scanners so that each page can be scanned sequentially.

3. A document scanner as claimed in claim 1 comprising two lamps in the housing one for illuminating one page and the other a second page of an opened book.

4. A document scanner as claimed in claim 1 comprising a single scanner and lamp whereby each page is illuminated and scanned through the same window.

5. A document scanner as claimed in claim 1 in which a channel is provided between the two lowermost edges of the two upwardly divergent sides of the trough so as to accommodate the spine of a book resting in the trough.

6. A document scanner as claimed in claim 1 wherein the two sides of the trough include means for relatively moving so as to alter at least one of the included angle therebetween and the lateral spacing between the two lowermost edges thereof, so as to allow the configuration of the trough to be varied to accommodate different book thicknesses and differently bound books.

7. A document scanner as claimed in claim 1 in which at least one of the sides of the trough is resiliently movable so as to allow the trough to follow precisely the configuration of any book laid therein, after the book has been entered by the wedge shaped housing.

8. A document scanner as claimed in claim 1 in which the surface of at least one of the two sides of the trough is at least in part formed from resiliently deformable material to accommodate any unevenness in the external surfaces of a book's covers.

9. A document scanner as claimed in claim 1 comprising two scanners in the housing and electrical switching means for selecting both scanners so that both pages can be scanned simultaneously.

10. A document scanner as claimed in claim 1 comprising a single scanner and lamp and means for displacing the scanner.

11. A document scanner as claimed in claim 1 in which said means for effecting relative movement comprises drive means for displacing the trough to be lifted up and lowered down relative to the scanner housing.

12. A document scanner as claimed in claim 11 in which the drive means is in two parts, one part being a powered drive for raising the trough up to a position at which it is a little below the wedge shaped housing and for lowering the trough in a downward direction from this position, and the other part being a manual drive by which the trough can, under the direct control of an operator, be moved upwardly to urge the book against the wedge shaped housing, and moved downwardly from this position, to allow the book to be removed or the pages turned.

* * * * *